United States Patent [19]
Poston

[11] Patent Number: 5,930,355
[45] Date of Patent: Jul. 27, 1999

[54] PROTECTION DEVICE FOR TELEPHONE LINE AND INTERFACE

[75] Inventor: Travis B. Poston, Herndon, Va.

[73] Assignee: Economic Development Bank For Puerto Rico, Hato Rey, Puerto Rico

[21] Appl. No.: 08/387,166

[22] Filed: Feb. 13, 1995

[51] Int. Cl.$^6$ .................................................. H04M 1/00
[52] U.S. Cl. .......................................... 379/451; 379/437
[58] Field of Search .................................. 379/451, 437, 379/438, 399; 340/550, 568; 109/38, 41, 42

[56] References Cited

U.S. PATENT DOCUMENTS

| | | | |
|---|---|---|---|
| 2,879,725 | 3/1959 | Zuver | 109/42 |
| 3,633,194 | 1/1972 | Kothe | 340/550 |
| 4,246,451 | 1/1981 | Nix | 179/146 R |
| 4,673,771 | 6/1987 | Grant | 174/38 |
| 4,731,819 | 3/1988 | Kalfon | 379/145 |
| 5,018,185 | 5/1991 | Riddle | 379/145 |
| 5,315,654 | 5/1994 | Kraft | 379/436 |
| 5,369,548 | 11/1994 | Combs | 361/643 |

*Primary Examiner*—Jack Chiang
*Attorney, Agent, or Firm*—McDermott, Will & Emery

[57] ABSTRACT

A non-armored apparatus for protecting an exterior telephone service line and telephone connection box. The apparatus comprises a layered structure which includes a non-conductive, preferably plastic or rubber substrate, which is sized and dimensioned to encase a space which includes the telephone service line and telephone connection box. A pair of conductive layers or films, separated by an insulating layer, are disposed on the substrate. Each of the conductive layers is electrically connected to an electrical contact which in turn is connected to a building alarm and/or security system. Detection switches are also provided to detect any unauthorized attempt to remove the shield. Any attempt by an intruder to cut the telephone service lines or disconnect the telephone connection box will trigger an alarm via the detection switch and/or a short circuit created between the conductive layers by, for example, use of a drill, saw, knife, or the like, to penetrate the shield.

12 Claims, 4 Drawing Sheets

PROTECTION DEVICE FOR TELEPHONE LINE AND INTERFACE

BACKGROUND

1. Field of the Invention

The present invention relates to a security device, and more particularly to an electrical shield to protect telephone service lines going into and out of a building and/or as associated exterior telephone interface or interconnection box.

2. Background of the Invention

Many security systems for homes and commercial buildings use telephone lines to automatically alert police and/or private security forces of attempted intrusions or disturbances. Security for such lines is crucial if the security system is to function as intended. Typically, the telephone lines within a building are connected to the telephone company service lines through an exterior-mounted interface or interconnection box. Such telephone service lines and interconnection boxes are subject to tampering, severing, or destruction by intruders or burglars who know to disable the telephone system in order to defeat the building security system.

In general, various devices have been proposed for protection of telephones and telephone lines from vandalism or intrusion. For example, Nix, in U.S. Pat. No. 4,246,451, provides a secure mounting and latching system for a coin telephone mounted on a post in which the telephone and coin box are received in a hardened (i.e., armored) recess closely dimensioned to the size of the telephone housing to frustrate any attempt to pry the telephone and coin box out of the support structure.

Grant, in U.S. Pat. No. 4,673,771, provides a modular, weather-proof terminal box housing designed to be positioned adjacent a large commercial building, the box being partly buried and having a removable panel to provide easy access for changing cables or telephone connections on an interconnection box at the exterior of the building.

Kalfon, in U.S. Pat. No. 4,731,819, describes a device for securing a coin box, such as those associated with pay telephones, to a post anchored to the ground. The installation presents a smooth surface having only a single access to the coin box in order to make the installation vandal-resistant.

Riddle, in U.S. Pat. No. 5,018,185, provides a tamper-resistant pay telephone which uses encasing armor, especially around the cord connecting the handset to the telephone, to make the telephone more vandal-resistant.

Further, some devices have been proposed for protecting exterior telephone lines and interconnection panels. For example, Kraft, in U.S. Pat. No. 5,315,654, and Combs, in U.S. Pat. No. 5,369,548, propose protection devices based upon an armor concept in which the physical strength of the protection body is the main deterrent to intrusion. Such protective devices, in addition to being expensive to manufacture and typically requiring professional installation, have proven vulnerable to attack by intruders using high-powered (typically battery-operated) drills or other powered cutting tools.

What is needed is an inexpensive, easy-to-install, protection device which, instead of relying on armor principles, simply presents a "smart" physical barrier or shield which does not rely on the principle of armor-type protection, but which will respond to an attack on it as if it were an intrusion attempt on the building, and which will automatically signal an alert to police and/or private security forces, for example, by using a pre-existing building security system.

SUMMARY OF THE INVENTION

It is an object of the present invention to provide a security device for exterior telephone lines and/or telephone line interconnection boxes.

It is a further object of the invention to provide a generally weather-resistant, non-armored physical barrier for exterior telephone service lines and/or telephone interconnection boxes, which will generate an alarm signal upon an attempt to disable the service lines or interconnection boxes.

It is still a further object of the present invention to provide an electronic shield which surrounds an exterior telephone line and/or interconnection box, and which signals an alarm upon an unauthorized attempt to access same.

It is yet a further object of the invention to provide a reliable and effective protective device which is inexpensive to manufacture and easy to install, and which preferably takes advantage of pre-existing security systems.

Additional objects, advantages and novel features of the invention will be set forth in part in the description which follows, and in part will become apparent to those skilled in the art upon examination of the specification or by practice of the invention. The objects and advantages of the invention may be realized and attained by means of instrumentalities and combinations particularly pointed out in the appended claims.

To achieve the foregoing and other objects, and in accordance with the purpose of the present invention, as embodied and broadly described herein, the shield apparatus according to this invention may comprise an electrical shield encasing an exterior telephone service line and interconnection box comprising a non-conductive substrate sized and configured to essentially fully enclose the telephone service line and interconnection box, the substrate being generally open at its front, i.e., the side affixed to the building wall, and at its bottom where the telephone service enters the shield. A pair of conductive layers are supported on the substrate and separated by a non-conductive layer with a pair of terminals being connected to respective ones of the pair of conductive layers and to an alarm. The electrical shield is secured to an exterior wall of a building in a manner so that the telephone service line and interconnection box are essentially fully encased in it.

Preferably, a detection device responsive to a disturbance of the position of the shield is used to trigger an alarm.

The detection device may preferably be in the form of one or more, and preferably two, switches which are responsive to movement of the electrical shield; the switches being disposed along opposite sides of the electrical shield and vertically staggered with respect to the orientation of the electrical shield when mounted. More preferably, the switches comprise plunger switches responsive to any relative displacement between the electrical shield and a wall on which the electrical shield is mounted to trigger an alarm.

Preferably, the first of the conductive layers is supported directly on the substrate, and further comprising an additional non-conductive layer disposed on the second of the pair of conductive layers whereby the inside of the electrical shield presents a non-conductive surface.

Preferably, the electrical terminals are supported by the substrate, one of the electrical terminals being connected to a first of the pair of conductive layers and a second of the pairs of conductive layers and the other of the electrical terminals being connected to the second of the conductive layers and insulated from the first of the conductive layers, whereby any electrical short circuit between the first and second conductive layers will activate an alarm.

BRIEF DESCRIPTION OF THE DRAWINGS

The accompanying drawings, which are incorporated in and form a part of the specification, illustrate various exemplary embodiments of the present invention and, together with the description, serve to explain the principles of the invention. In the drawings.

DETAILED DESCRIPTION OF THE INVENTION

Reference will now be made in detail to a presently preferred embodiment of the invention, an example of which is illustrated in the accompanying drawings.

Figure 1:
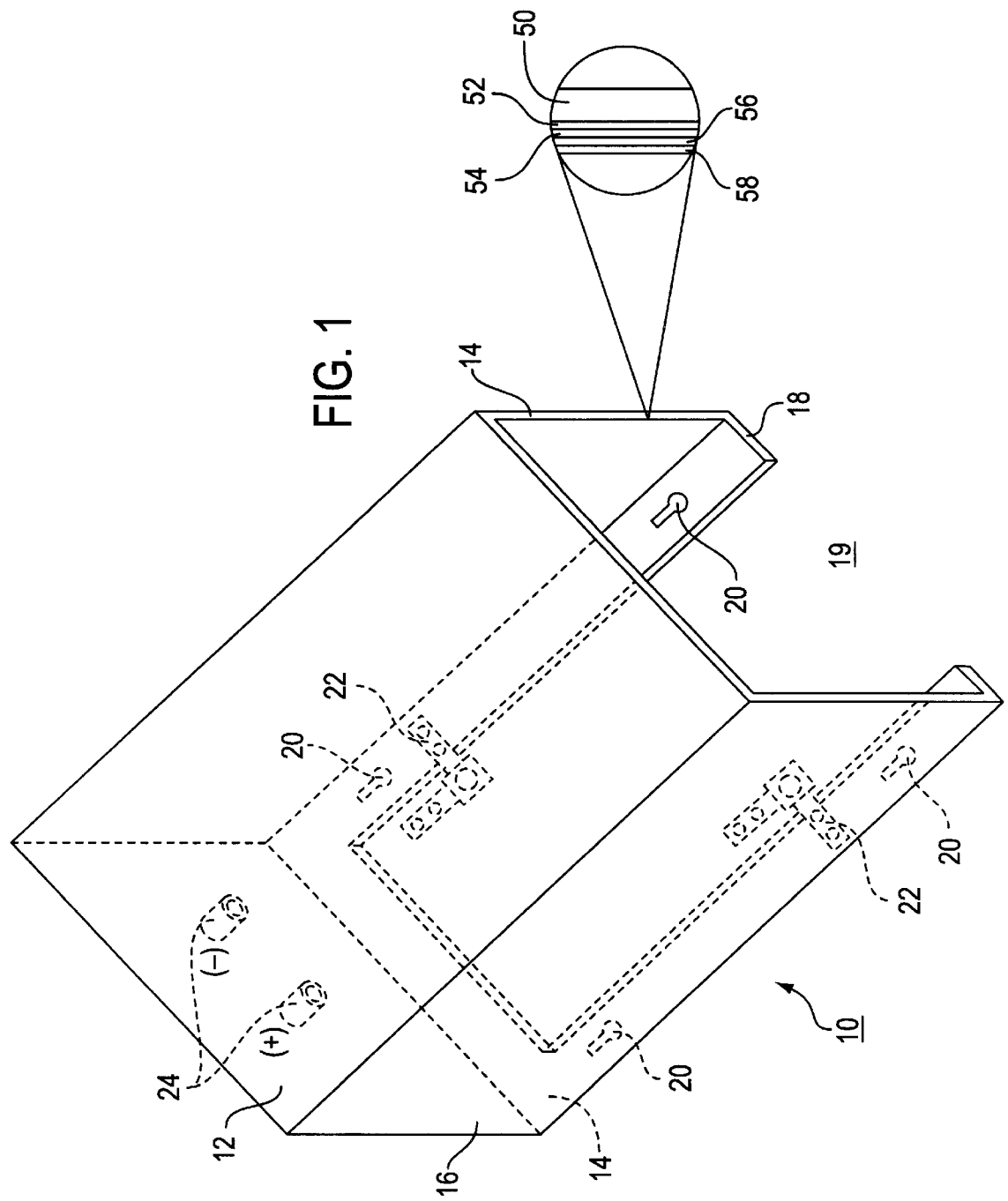
FIG. 1 is a perspective view, in partial phantom, of a shield box according to the present invention, showing typical locations for shield removal detectors (e.g., plunger switches) and shield alarm terminals and a magnified cross-section of the conductive and non-conductive layers which form the shield.

Referring first to FIG. 1, there is depicted a shield box 10. As explained below, the box 10 need only provide a generally structurally rigid support, it need not function as a protective armor, although preferably it will be generally water proof and weather resistant, both to protect the encased telephone lines and/or interconnection box and to avoid the need for periodic replacement due to cracking or the like.

As explained below, the shield box 10 forms an electronic shield as a result of its multi-layered construction. The box 10 includes a back wall 12, sidewalls 14, a top wall 16, and flanges 18. The box is open at the bottom and is mounted on the side of a building by means of the flanges 18 positioned along the front (open) side of the box and which are provided with a plurality of mounting notches 20, so as to securely hold the box when it is set on appropriate screws or the like and then slid into place. Means are preferably provided to generate an alarm signal if an unauthorized attempt is made to remove the box 10 from the building wall once it is set in place. Such means preferably comprises one or more plunger switches 22, or similar devices as further described below. Contact terminals 24 are provided for connecting the conductive layers of electronic shield of the box 10 to an alarm system. The contact terminals 24 are preferably wired to an existing alarm or security device within the building, as are the alarm-generating means 22.

As will be appreciated by the artisan, although the shield box 10 is depicted in the form of a rectangular box, open at the bottom 19 and having mounting flanges 18 at the front, other shapes and physical configurations will suggest themselves to the artisan for particular applications and are within the scope of the present invention. The configuration depicted is, however, an economical one to mold and manufacture.

Figure 2:
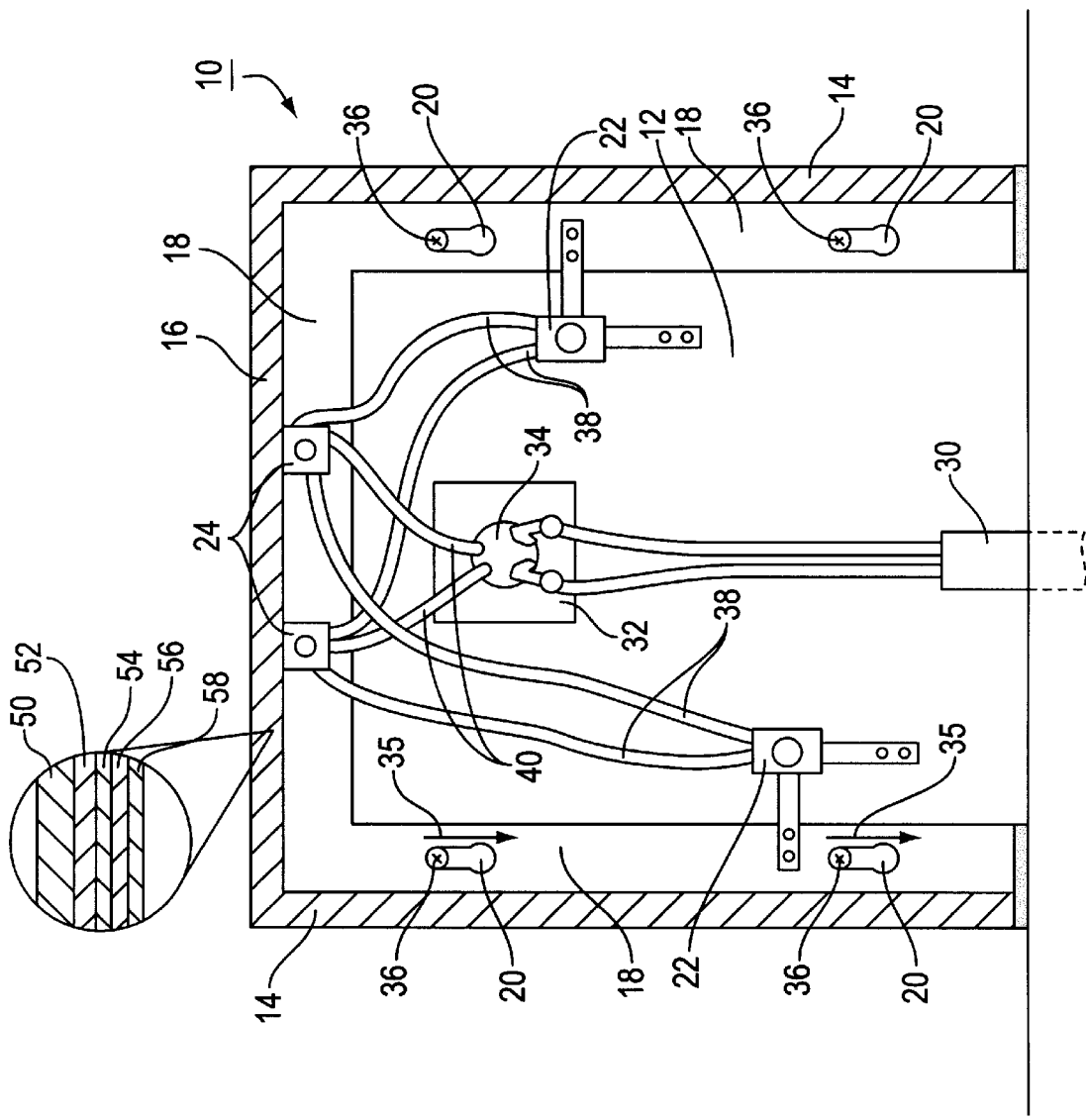
FIG. 2 is an elevation view, in partial section, showing the shield box of FIG. 1 in its mounted condition and illustrating in a magnified cross-section of the conductive and non-conductive layers which form the shield.

Turning now to FIG. 2, an example of a shield box mounted on a building is depicted. The box is viewed as it would be seen by someone outside the building on which the box is mounted and, for purposes of illustration only, assumes the back wall of the box is cut away.

In the example depicted, the telephone service line 30 extends from below grade directly into the box 10 and is wired onto the interface or interconnection box 32. It is important that the service line 30 be completely encased. From the box 32, the telephone service enters the building through an access hole 34. The shield box 10 is mounted on the building using appropriate hardware, such as, for example, mounting screws 36 positioned in the mounting slots 20. Preferably, the mounting screws are positioned to protrude from the wall to engage the flange 18 as the box 10 is slid down on the screws in the direction indicated by the arrows 35.

The box 10 preferably extends to, and more preferably beneath, the grade level in order to fully encase the service line(s) provided by the telephone company.

Figure 4:
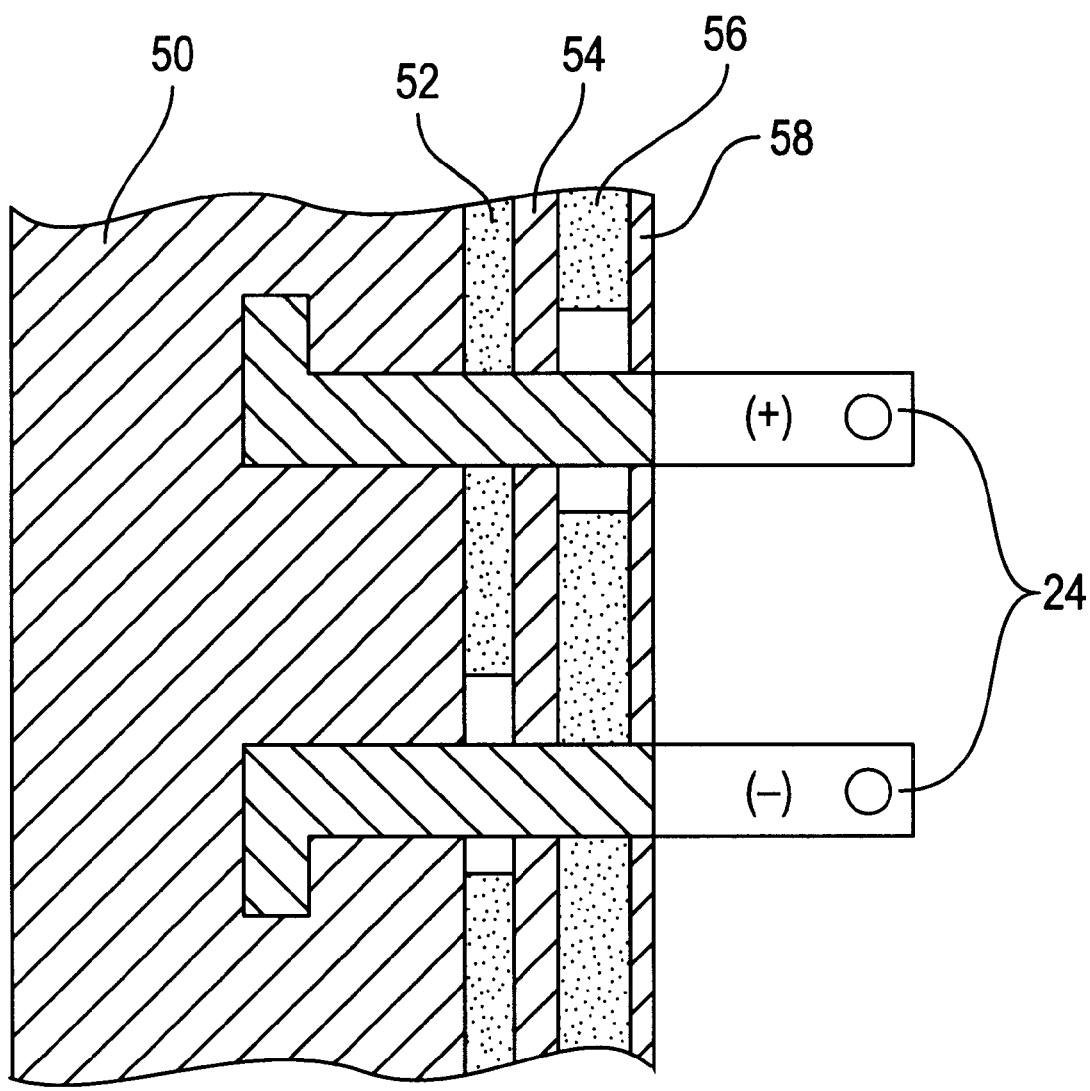
FIG. 4 is a plane view, in partial section, of the electrical terminal service for the shield box of FIG. 1 illustrating the various layers of the box structure and the electrical connections of the conductive layers.

As seen in FIG. 2, the shield box removal protection devices, preferably in the form of one or more plunger switches 22, are interconnected, via wires 38, to the contact terminals 24, which, as best seen in FIG. 4, are connected to the conductive layers which form the electronic shield. The contact terminals 24 are preferably connected to the building security device via leads 40.

When, as depicted in FIG. 2, more than one plunger switch 22 is used, the switches are preferably vertically staggered and positioned on opposite sides of the box 10 so as to be more sensitive to any attempt to pry the box 10 off the wall on which it is affixed, or otherwise tamper with the box 10.

As best seen in FIG. 2, a section through the top, sides and front walls of the box will now be described in detail. The flange portions 18, which in use are not exposed, need not be made of the layered structure described below.

The outer layer 50 is preferably made of plastic or a hard rubber compound, molded or otherwise formed into the desired size and shape. This layer should be sufficiently rigid to provide structural integrity for the box and to function as a substrate for the remaining layers and should be non-conductive and preferably able to tolerate the elements such as rain, cold, heat, sun, etc., without degradation.

The adjacent layer, 52, is an electrically conductive layer, and may preferably be in the form of a thin coat of conductive paint, polymer ink, or the like, such as materials commercially available from Spraylet, Inc. of New York or Shieldmate Robotics, Inc. of Illinois. As best seen in FIG. 4, this layer will be connected to either a positive (+) or a negative (–) potential by means of a connection to the positive or negative space of the terminal pair 24.

The next adjacent layer, 54, is an electrical insulating layer, preferably in the form of a thin plastic shell or a "coat" of plastic material.

The next adjacent layer, 56, is like the layer 52, an electrically conductive layer preferably formed from conductive paint or polymer ink, as discussed above.

The final layer, 58, which, as will be appreciated by the artisan, used to ensure the long-term integrity of the layer 56, is an additional electrically non-conductive layer, for example, a thin plastic shell or coating of a plastic-type material.

Figure 3:
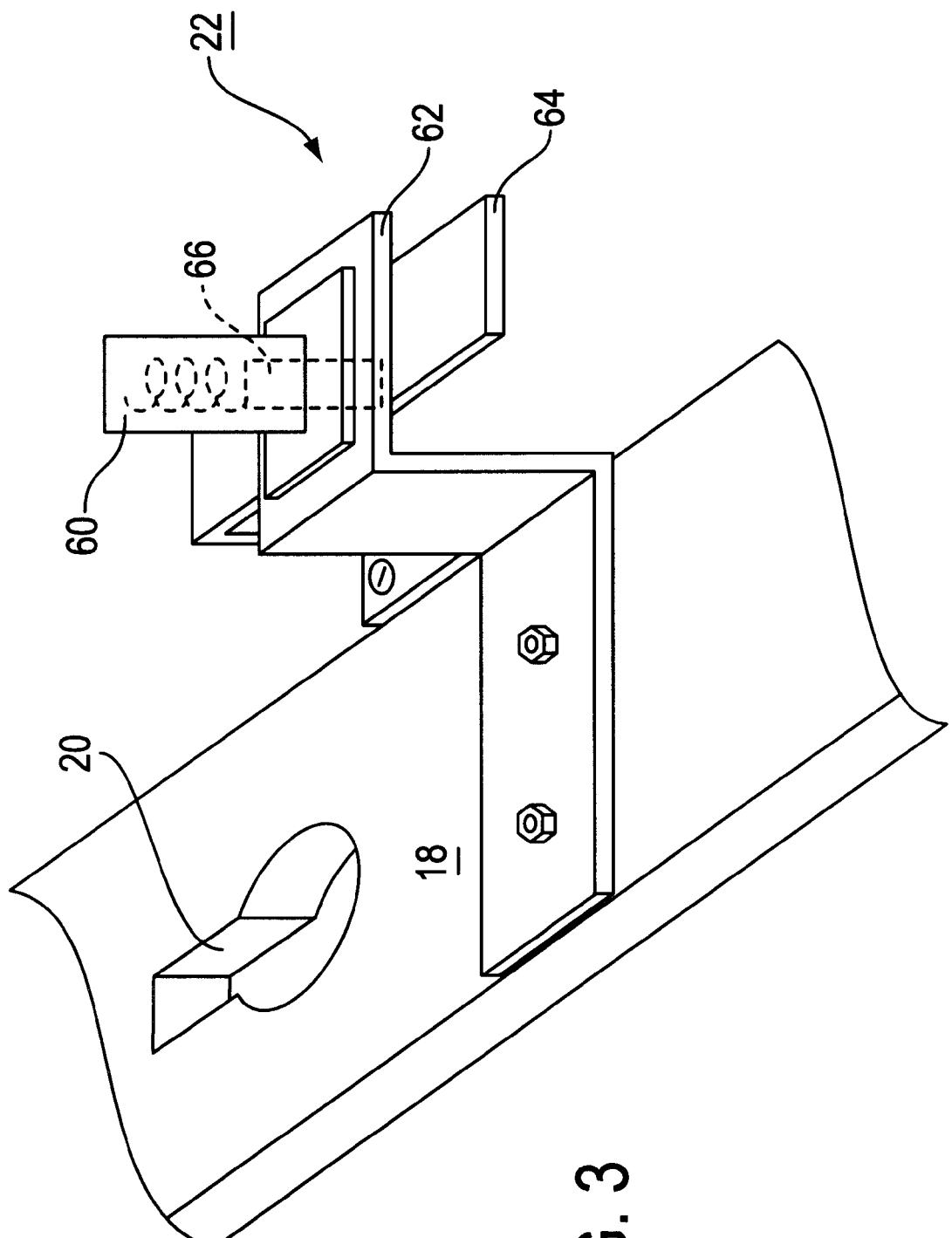
FIG. 3 is a perspective view of a detail of the mounting structure and removal detection system for the shield box of FIG. 1.

Turning now to FIG. 3, there is depicted an example of a security device 22, in the form of a plunger switch to detect any unauthorized attempt to pry off or otherwise remove the box 10 from the building on which it is installed. In the illustrated example, the plunger switch 60 is mounted on a pair of "Z" brackets 62 and 64, which in turn are mounted on the flange 18 and on the building wall, respectively. Preferably the flange mounted "Z" bracket 62 is horizontally oriented with respect to the mounted shield box 10, while the "Z" bracket 64 is vertically oriented. In other words, the "Z" brackets 62 and 64 are generally at right angles to each other and, as alluded to above and as best seen in FIG. 2, when two or more such devices are used, they are preferably positioned on opposite side flanges 18 and vertically staggered.

In the embodiment illustrated, the plunger switch 60 is mounted above the topmost "Z" bracket which, in the illustrated embodiment, corresponds to the horizontally oriented bracket 62. The spring biased plunger element 66 passes through a hole in the bracket 62 and seats against the vertically aligned bracket 64 so that, if the shield box 10 is pried away from or otherwise removed from the building wall, the plunger switch (which is preferably connected to the building alarm) will activate the alarm.

Turning now to FIG. 4, there is depicted an exemplary structure for connecting the terminal pair 24 to the conductive layers 52 and 56. The terminals 24 are preferably embedded in the outer layer 50 in a conventional manner. The conductive layer 52 is disposed so as to only make electrical contact with one of the terminals 24, for example the positive terminal, while the conductive layer 56 is disposed so as to only make contact with the other of the terminals 24, in the illustrated example, the negative terminal. The conductive layers 52 and 56 are separated from each other by the non-conductive layer 54. The areas of contact between the conductive layers 52 and 56 and their respective terminals 24 are preferably secured by means of a conductive epoxy or the like. As alluded to above, the terminals 24 are connected to an alarm system, preferably the main alarm system for the building or residence. Configured in this way, any attempt to drill or otherwise cut through the plastic will short circuit the conductive (e.g., paint) layers, thereby triggering the alarm. Any unauthorized attempt to remove the shield, e.g., by prying it off the wall, will likewise trigger an alarm by means of the devices 22. However, simply by deactivating the plunger switch activated alarm, authorized access to the telephone cable and connector box can be accomplished by lifting the box up and off of its screw fasteners.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A passive electrical shield for securing an exterior telephone service line and interconnection box without an armored casing said, shield comprising:

a non-conductive, non-armored substrate sized and configured to essentially fully enclose the telephone service line and interconnection box, substrate being in the form of an enclosure having an opening at one front side thereof and at its bottom;

a pair of conductive layers supported on said substrate and separated by non-conductive layer;

terminal means for connecting said conductive layers to an alarm; and means for securing said electrical shield to an exterior wall of a building with said front opening opposing said wall whereby said telephone service line and interconnection box are essentially fully encased therein; and wherein said conductive layers are adapted to be short circuited together in the event of an intrusion attempt thereby completing an electrical circuit whereby said alarm will be triggered.

2. The electrical shield according to claim 1, further comprising a detection means, responsive to a displacement of the shield with respect to the wall, to trigger said alarm.

3. The electrical shield according to claim 2, wherein said detection means comprises at least one switch responsive to movement of said electrical shield for generating an electrical signal.

4. The electrical shield according to claim 1, wherein a first of said conductive layers is supported directly on said substrate, and further comprising an additional non-conductive layer disposed on the second of said pair of conductive layers whereby the inside of said electrical shield presents a non-conductive surface.

5. The electrical shield according to claim 3, wherein said detection means comprises at least two switches responsive to movement of said electrical shield, said switches being disposed along opposite sides of said electrical shield and vertically staggered with respect to the orientation of said electrical shield when mounted.

6. The electrical shield according to claim 1, further comprising a flange means disposed along the front open side of said electrical shield and including means for mounting said electrical shield on a surface.

7. The electrical shield according to claim 6, wherein said surface comprises an exterior wall of a building on which said interconnection box is mounted and having an access opening for telephone service, and wherein said electrical shield essentially encloses said access opening.

8. The electrical shield according to claim 7, wherein said building is equipped with an alarm system and said terminal means and detection means are connected to said alarm system and further comprising detection means, responsive to a disturbance in the position of said shield for triggering said alarm system.

9. The electrical shield according to claim 6, wherein said surface has fasteners extending therefrom and said mounting means comprises a mounting slot for accommodating said fasteners.

10. The electrical shield according to claim 3, wherein said switch comprises a plunger switch responsive to a relative displacement between said electrical shield and a surface on which said electrical shield is mounted to trigger alarm.

11. The electrical shield according to claim 3, further comprising a flange means disposed along the front open side of said electrical shield and a first bracket mounted on said flange and having a portion extending into the space encased by said shield, and a second bracket having a portion extending into said space proximate to the portion of said first bracket, wherein said switch comprises a plunger switch responsive to a relative displacement between said brackets to trigger an alarm.

12. The electrical shield according to claim 1, wherein said terminal means comprises a pair of electrical terminals supported by said substrate, one of said electrical terminals being connected to a first of said pair of conductive layers and a second of said pairs of conductive layers and the other of said electrical terminals being connected to the second of said conductive layers and insulated from the first of said conductive layers, whereby an electrical short circuit between said first and second conductive layers will activate said alarm.

* * * * *